United States Patent Office.

WILLIAM ARTHUR CALDECOTT, OF JOHANNESBURG, SOUTH AFRICAN REPUBLIC.

EXTRACTION OF GOLD OR OTHER PRECIOUS METALS FROM SLIMES.

SPECIFICATION forming part of Letters Patent No. 649,628, dated May 15, 1900.

Application filed January 31, 1898. Serial No. 668,667. (No specimens.)

*To all whom it may concern:*

Be it known that I, WILLIAM ARTHUR CALDECOTT, analytical chemist, a resident of Johannesburg, Transvaal, South African Republic, have invented certain new and useful Improvements in the Extraction of Gold or other Precious Metals from Slimes, of which the following is a specification.

This invention relates to the extraction of gold and other precious metals from slimes; and the object of my improvement is to devise a new and efficient method for such purpose. The manner of practicing my invention will fully appear from the following specification.

It is well known that oxygen is necessary to the solution of gold in the extraction thereof by means of cyanogen compounds, and I do not claim to have discovered this.

It has been found that in the cyanid treatment of certain slimes derived from pyritic ore as ordinarily conducted by agitation, settling, and decanting off the gold-bearing solution a large percentage of the gold in the slimes remains undissolved; but the exact reason thereof has not been properly known. I have discovered that this is due to the presence in the slimes of reducing substances—such as ferrous compounds, particularly ferrous sulfid (FeS)—and I have discovered a method of getting rid of the ferrous sulfid or other ferrous compounds, as well as other reducing substances, which I claim to be the cheapest and best.

My method—*e. g.*, in the treatment of slimes containing ferrous sulfid—consists in pumping air into the vat containing the slime-pulp, which has been rendered alkaline and is undergoing agitation in the ordinary way. This is done by delivering the air from an air-compressor or other suitable machinery near the bottom of the vat through a perforated pipe or other suitable appliance, whereby the greatest surface of air-bubbles is brought into contact with the slime-pulp. This preliminary aeration is continued until it is ascertained by ordinary tests that the ferrous sulfid is no longer present, having been oxidized into the ferric state and by a further reaction with the slime present converted into innocuous ferric hydrate, $(Fe_2(OH)_6.)$ This ferric hydrate neither abstracts oxygen from the solution, thereby preventing the gold from being dissolved, nor consumes cyanid, as is the case with ferrous sulfid and other ferrous compounds. Cyanid is then added to the slime-pulp, and the aeration is continued until practically all the gold is dissolved. The same result as regards the solution of the gold could be obtained by adding the cyanid simultaneously with the introduction of air into the slime-pulp; but this will involve needless consumption of cyanid.

I do not claim the exclusive use of air as an oxidizing agent for dissolving gold in auriferous substances; but I do claim that the aeration of slimes containing ferrous sulfid or other ferrous compounds, as well as other reducing substances, is the best and cheapest method of enabling the gold in such slimes to dissolve in such a time as will permit of their profitable treatment on a large scale.

Having thus minutely described my invention, what I claim as new, and desire to secure by Letters Patent, is—

The method hereinbefore described of extracting precious metals from finely-divided materials, such as slimes, containing reducing substances such as ferrous sulfid or hydrate, which consists in rendering the material alkaline, then forcing air into the pulp until the ferrous compounds are converted into ferric hydrate, then adding cyanid and continuing aeration and agitation until the precious metals are dissolved.

Signed at Johannesburg, Transvaal, South African Republic, this 3d day of December, 1897.

WILLIAM ARTHUR CALDECOTT.

Witnesses:
 GEO. MCDOUGALL,
 WM. NIXON.